Oct. 9, 1928.

F. WEIDERT 1,686,944

PHOTOGRAPHIC BOX CAMERA

Filed Aug. 5, 1924

Inventor:
Franz Weidert
By B. Singer, Atty.

Patented Oct. 9, 1928.

1,686,944

UNITED STATES PATENT OFFICE.

FRANZ WEIDERT, OF BERLIN-ZEHLENDORF, GERMANY, ASSIGNOR TO OPTISCHE ANSTALT C. P. GOERZ AKTIENGESELLSCHAFT, OF BERLIN-FRIEDENAU, GERMANY.

PHOTOGRAPHIC BOX CAMERA.

Application filed August 5, 1924, Serial No. 730,147, and in Germany August 13, 1923.

My invention relates to an improved box camera and the object of my invention is to provide a camera of the stated type which in spite of its simple construction allowing cheap manufacture has the valuable features of little length of the box or casing and of its inaccessible lens surfaces being secured against being soiled by dust and dirt and its movable parts against being injured through external influences.

With these objects in view I provide in the camera an object-glass of meniscus shape with its convex face looking outwards and a diaphragm and a shutter inside thereof, so that the latter cannot be injured, while at the same time it is possible to insert the said object-glass or objective immediately into the front wall of the box or casing of the camera, if desired.

The objective which I employ, may be a simple achromate, preferably having the condensing lens on its outer side or even a simple meniscus, since in cameras of this type ordinarily objectives having a low ratio of aperture are used.

By the provision in the camera of an objective or object-lens having its convex face turned towards the outside, in combination with a rear diaphragm I realize, in contradistinction to the hitherto constructed usual box cameras having a simple lens of the shape of a landscape-lens with a front diaphragm, the important advantages of reducing the length of the camera casing by 25 to 30 per cent, while maintaining the like focal distance and of preventing the parts from being soiled and injured. Obviously in the cameras as heretofore constructed the necessity prevails of arranging the objective and the shutter at a distance apart from each other in a manner that the parts are very liable to soiling and injury.

Figure 1:
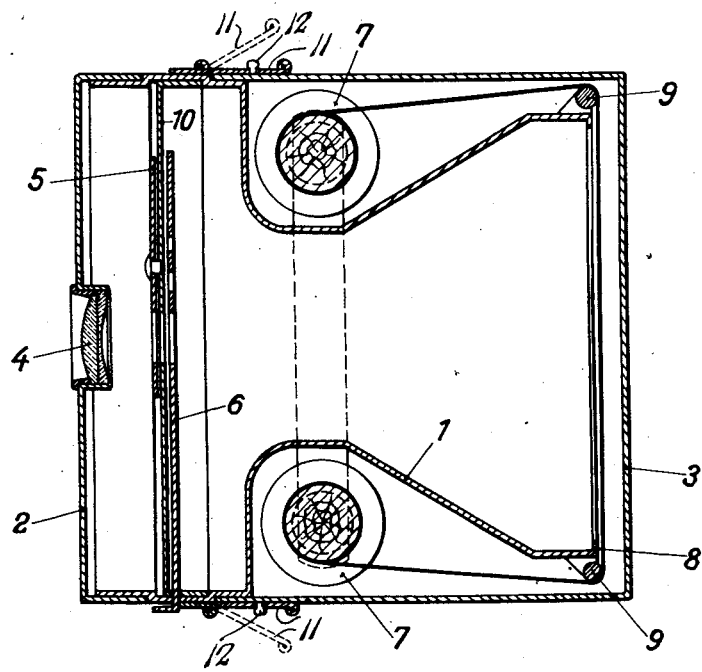
Figure 2:
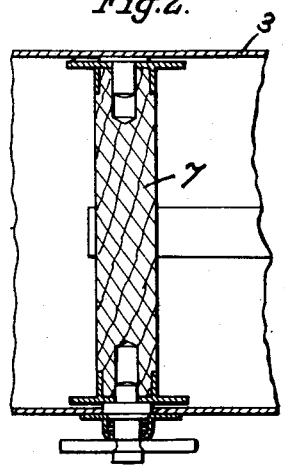

The various features of my invention are embodied in the roll-film camera which is illustrated in the accompanying drawings, in which Figure 1 is a longitudinal sectional view, and Figure 2 is a detail transverse sectional view.

The box or casing of the camera shown in the drawing comprises an inner body 1 and two outer caps 2 and 3. In the front wall of the cap 2 the object-glass or objective 4 is inserted. The latter consists of a simple achromatic lens with its convex face turned towards the outside. 5 is a rotatable disc provided with an opening forming the shutter and 6 is a slide with a plurality of openings of different diameters forming an adjustable diaphragm. Shutter and diaphragm which may be given any other suitable shape are mounted on a wall 10 positioned within the box at a distance from the objective, and mounted on part 1.

The inner body 1 of the casing is shaped and recessed to accommodate two film spools 7 with the film running from the one spool to the other one.

The rear portion of the inner body 1 is shaped to form a picture frame, the two lateral borders 8 of which are shown in the drawing. 9 designates two film guiding rollers.

What I claim is:—

In a photographic film box-camera a carrier element adapted to carry the film spools and provided with film guiding rollers a wall mounted on said carrier element in front of the film spools and film guiding rollers, a shutter and a diaphragm mounted on said wall, two caps adapted to be put on said carrier element from opposite ends thereof so as to form a light tight casing or box and an objective in the form of a meniscus mounted in the front end cap.

In testimony whereof I have signed this specification.

DR. FRANZ WEIDERT.